(12) United States Patent
Wehowski

(10) Patent No.: US 11,932,126 B2
(45) Date of Patent: Mar. 19, 2024

(54) INDUCTION ASSEMBLY OF AN INDUCTION CHARGING DEVICE

(71) Applicant: MAHLE International GmbH, Stuttgart (DE)

(72) Inventor: Manuel Wehowski, Bietigheim-Bissingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/017,394

(22) PCT Filed: Jul. 22, 2021

(86) PCT No.: PCT/EP2021/070519
§ 371 (c)(1),
(2) Date: Jan. 20, 2023

(87) PCT Pub. No.: WO2022/018200
PCT Pub. Date: Jan. 27, 2022

(65) Prior Publication Data
US 2023/0331100 A1    Oct. 19, 2023

(30) Foreign Application Priority Data
Jul. 23, 2020   (DE) ..................... 10 2020 209 282.6

(51) Int. Cl.
*H02J 7/00*    (2006.01)
*B60L 53/12*    (2019.01)
(Continued)

(52) U.S. Cl.
CPC .......... *B60L 53/12* (2019.02); *H01F 27/2876* (2013.01); *H01F 27/306* (2013.01)

(58) Field of Classification Search
USPC ....................................................... 320/108
See application file for complete search history.

(56) References Cited

U.S. PATENT DOCUMENTS 9,862,282 B2    1/2018  Böser
10,756,572 B2    8/2020  Ansari
(Continued)

FOREIGN PATENT DOCUMENTS

DE    102013010695 A1    8/2014
DE    102017200465 A1    11/2017
(Continued)

OTHER PUBLICATIONS

English abstract for DE-10 2019 216 140.
(Continued)

*Primary Examiner* — Samuel Berhanu
(74) *Attorney, Agent, or Firm* — Fishman Stewart PLLC

(57) ABSTRACT

An induction assembly may include a coil carrier, a coil winding, a core assembly, and a heat exchanger. The coil carrier may include an upper wall, a lower wall located opposite the upper wall, and a receiving space. The coil winding may be disposed in the receiving space. The core assembly may form a coil with the coil winding. The core assembly may include at least two core bodies that are spaced apart from one another by a gap. The heat exchanger may include an inner panel spaced apart from the core assembly and an outer wall located opposite the inner panel. The outer wall may limit a flow space through which a flow path of a cooling fluid for controlling a temperature of the induction assembly leads.

20 Claims, 3 Drawing Sheets

(51) Int. Cl.
H01F 27/28 (2006.01)
H01F 27/30 (2006.01)

(56) References Cited

U.S. PATENT DOCUMENTS

| | | | |
|---|---|---|---|
| 10,784,035 | B2 | 9/2020 | Ueda |
| 11,211,189 | B2 * | 12/2021 | Nishimura .............. H01F 38/14 |
| 11,214,156 | B2 | 1/2022 | Laemmle |
| 11,552,502 | B2 | 1/2023 | Laemmle |
| 2017/0169942 | A1 | 6/2017 | Yuasa |
| 2017/0253129 | A1 * | 9/2017 | Garcia ................... H01F 27/10 |
| 2018/0025827 | A1 | 1/2018 | Czainski |
| 2020/0398687 | A1 * | 12/2020 | Laemmle .............. H02J 50/005 |

FOREIGN PATENT DOCUMENTS

| | | |
|---|---|---|
| DE | 112016003866 T5 | 5/2018 |
| DE | 102018203557 A1 | 9/2019 |
| DE | 102019212277 A1 | 5/2020 |
| DE | 102019216140 A1 | 5/2020 |

OTHER PUBLICATIONS

International Preliminary Report on Patentability for PCT/EP2021/070519, dated Sep. 22, 2022 (with English translation).

\* cited by examiner

INDUCTION ASSEMBLY OF AN INDUCTION CHARGING DEVICE

CROSS-REFERENCE TO RELATED APPLICATIONS

This application claims priority to International Patent Application No. PCT/EP2021/070519, filed on Jul. 22, 2021, and German Patent Application No. DE 10 2020 209 282.6, filed on Jul. 23, 2020, the contents of both of which are hereby incorporated by reference in their entirety.

TECHNICAL FIELD

The present invention relates to an induction assembly of an inductive charging device for inductively charging a battery, in particular of a motor vehicle.

BACKGROUND

It is known to directly connect a battery to a charging station via a power cable and to thus charge it. Batteries of this type are used, for example, in a motor vehicle. This requires a respective manual intervention by a user. Charging devices for inductively charging the battery are also known. Charging devices of this type usually have two induction assemblies, wherein one of the induction assemblies is arranged outside of the corresponding application, in particular outside of the motor vehicle, and is electrically connected to a charging station, also referred to as wall box. This induction assembly, which is also referred to as ground assembly in the case of charging devices for motor vehicles, cooperates with an induction assembly arranged in the corresponding application, in particular in the corresponding motor vehicle, which is also referred to as vehicle assembly in the case of charging devices for motor vehicles. Outside of the application in the induction assembly, the induction assembly induces an electric current in the induction assembly within the application in a known manner during operation in order to charge a battery of the application.

In addition to a corresponding coil, the respective induction assembly usually also has electronics. During operation of the respective induction assembly, this leads to the heat development, which can lead to a power reduction or efficiency reduction, respectively, of the charging device. In addition, heat developments of this type can lead to damages to the component parts of the respective induction assembly. It is thus conceivable to cool the respective induction assembly in order to eliminate or to at least reduce these disadvantages.

An induction assembly comprising a bottom and a cover as well as a support structure arranged between the bottom and the cover is known from DE 10 2019 212 277 A1. The induction assembly has a coil winding 5 as well as a core assembly comprising core bodies. A cooling channel system, through which a cooling fluid flows, is arranged between the bottom and the cover.

DE 11 2016 003 866 T5 shows an induction assembly comprising a two-piece coil carrier, which has an upper wall as well as a lower wall. The upper wall and the lower wall abut directly on one another, wherein a coil winding is received in the upper wall. In one example, a core assembly is arranged on the side of the lower wall facing away from the upper wall. Hollow spaces for forming channels, through which a cooling fluid flows, are further molded within the lower wall. In another example, the channels follow the spiral shaped course of the coil winding and are arranged between consecutive windings of the coil winding.

When using charging devices of this type, unwanted electromagnetic interactions of the induction assembly, in particular of the respective coil, with other component parts, can further lead to interferences of and damages to the charging device and/or the corresponding application. In a plurality of applications, in particular in a motor vehicle, a small installation space requirement is to also be observed.

SUMMARY

The present invention thus deals with the object of specifying an improved or at least another embodiment for an induction assembly of the above-mentioned type, which is characterized in particular by an improved efficiency with reduced installation space requirement.

This object is solved according to the invention by means of the subject matter of independent claim(s). Advantageous embodiments are the subject matter of the dependent claim(s).

The present invention is based on the general idea of forming an induction assembly of a charging device for inductively charging a re-chargeable battery, in particular of a motor vehicle, comprising a coil carrier, in which a coil winding is received, and on which there is arranged a core assembly, which, together with the coil winding, forms the coil of the induction group, comprising at least two core bodies, and to provide the coil carrier with protruding protrusions for positioning the core bodies as well as for mechanically reinforcing the coil carrier, wherein a heat exchanger for controlling the temperature of, in particular cooling, the induction assembly is arranged on the side of the core assembly facing away from the coil carrier and has a panel, which is adjacent to the core assembly and which has elevations formed in the region of the protrusions. A compact and mechanically stable construction of the induction assembly are thus attained. In the case of reduced installation space requirement, the elevations of the panel of the heat exchanger further lead to an efficient electromagnetic shielding of the coil to the outside. The knowledge that electromagnetic effects, which need to be shielded, appear to a greater extent in the region of the protrusions and thus in a gap formed between adjacent core bodies, is used hereby. The elevations formed in the region of the protrusions and thus of the gaps lead to an increased distance of the panel to the gap in this region and thus to an effective shielding, which simultaneously saves installation space. The panel thereby simultaneously limits a space of the heat exchanger, through which a fluid for controlling the temperature of, in particular cooling, the induction assembly flows during operation. The elevations thereby simultaneously lead to a reduction of the cross section, which can be flown through, in the region of the elevations and thus to an increase of the flow speed. An increased heat transfer and thus an intensified temperature control, in particular cooling, thus takes place in this region during operation. This means that in addition to the installation space-saving and efficient shielding, an efficient cooling and thus an efficiency increase of the induction assembly is simultaneously at hand.

In accordance with the idea of the invention, the induction assembly has the coil carrier. The coil carrier has an upper wall and a lower wall located opposite the upper wall, which limit a receiving space. A coil winding is received in the receiving space. Together with the core assembly, the coil winding forms a coil of the induction assembly. The core assembly is thereby arranged on the side of the lower wall facing away from the upper wall. The core assembly has at least two core bodies, which are spaced apart from one another by means of a gap, wherein the coil carrier has a corresponding protrusion for at least one of the at least one gap, which protrudes from the lower wall and which penetrates into the corresponding gap. The heat exchanger has the panel, which is also referred to hereinafter as inner panel. The inner panel is arranged on the side of the core assembly facing away from the lower wall, and, with an outer wall of the heat exchanger located opposite the inner panel, limits a flow space, through which a flow path of a cooling fluid leads for controlling the temperature of the induction assembly. During operation, cooling fluid thus flows through the flow space in order to control the temperature of, in particular to cool, the induction assembly. For at least one of the gaps, the inner panel thereby has a corresponding elevation, which is directed away from the lower wall or the core assembly, respectively, and which is molded in the inner panel. This means that the elevation is formed as a formation of the inner panel, which is directed away from the lower wall.

The induction assembly is preferably that induction assembly of the charging device, which, in the corresponding application, is provided with the battery to be charged. This means in particular that the coil of the induction assembly is the secondary coil of the charging device.

The charging device is used in particular for charging a battery of a motor vehicle. The induction assembly is thereby advantageously the vehicle-side induction assembly, also referred to as vehicle assembly.

In general, the coil can be any coil. The coil is preferably a flat coil. This leads in particular to a further reduction of the installation space requirement of the induction assembly. The coil winding can thereby be any type. The coil winding is in particular spiral shaped.

The core assembly is in particular a core assembly, which is ferromagnetic. This means in particular that the respective core body is ferromagnetic. In particular, the core bodies are ferrite bodies.

Expediently, the coil carrier differs from a metal or an alloy. The coil carrier is in particular made of plastic.

In the case of preferred embodiments, the outer wall of the heat exchanger is formed as a panel, hereinafter also referred to as outer panel. This means that the inner panel and the outer panel limit the flow space of the heat exchanger. The inner panel and the outer panel in particular form a two-layer cooling plate. In addition to a compact construction, an efficient cooling and an efficient electromagnetic shielding are thus attained.

The induction assembly preferably has an electronics, which is electrically connected to the coil, in particular to the coil winding. The electronics in particular contains a converter, in particular an AC/DC converter. Expediently, the electronics has electronic components. It is preferred thereby when at least one of the electronic components of the electronics is arranged on the side of the outer wall facing away from the inner panel, in particular of the outer panel. A particularly effective electromagnetic shielding of the component, in particular of the electronics, with simultaneously compact construction is thus attained. In this way, the electronics can additionally be cooled by means of the heat exchanger.

Embodiments, in the case of which at least one of the gaps, advantageously the respective gap, extends longitudinally, are considered to be advantageous. This means that at least one of the at least one gap extends longitudinally transversely to the distance direction of the corresponding core bodies and thus has a gap length, which runs transversely to the distance direction and which is larger than a gap width of the gap, which runs in the distance direction. The gap length is in particular at least twice as large as the gap width. It is in particular conceivable that at least one of the at least one gap extends longitudinally over the entire extension of the corresponding core bodies.

It is preferred when the elevation belonging to the longitudinally running gap is likewise molded longitudinally. This means in particular that the elevation extends longitudinally in parallel along the corresponding gap. The elevation advantageously extends over the entire length of the corresponding gap. The electromagnetic shielding with the inner panel as well as the temperature control, in particular cooling, with the heat exchanger are thus improved.

Embodiments, in the case of which the width of at least one of the at least one elevations, hereinafter also referred to as elevation width, is adapted to the gap width of the corresponding gap are advantageous. This means that parallel to the gap width of the corresponding gap, at least one of the at least one elevations has an elevation width, which corresponds to the gap width. It is further preferred when the elevation and the gap are arranged relative to one another in such a way that the gap width and the elevation width overlap. An improved electromagnetic shielding takes place in this way. In addition, an improved temperature control, in particular cooling, is attained with the help of the heat exchanger in this way.

In the case of an advantageous further development of the solution according to the invention, the core assembly is spaced apart from the lower wall, so that the lower wall and the inner panel limit a space, in which the core assembly and the at least one gap are arranged. The space is thereby preferably filled with a heat-conducting casting compound and is thus hereinafter also referred to as casting space. This leads to an improved heat transfer between the heat exchanger and the coil and thus to a more efficient cooling and an increased performance of the induction assembly.

The inner panel can generally be made of any metal or any metal alloy.

The inner panel preferably contains aluminum. This means that the inner panel is preferably made of aluminum or an aluminum alloy. Improved electromagnetic shielding properties of the inner panel are thus attained. The induction assembly is additionally weight-reduced in this way.

The outer panel can generally also be made of any metal or any metal alloy. The outer panel in particular contains aluminum, i.e. an aluminum panel or an aluminum alloy panel, respectively.

A nub structure is preferably provided in the flow space on the side of the inner panel facing away from the core assembly. The nub structure has locally formed nubs, which are spaced apart from one another. The nubs in particular serve the purpose of generating turbulence in the flow of the cooling fluid and/or improve the internal pressure resistance of the heat exchanger, in particular of the inner panel. In their extension, in particular along the length and/or along the width of the at least one elevation, the nubs can be smaller than the elevation.

The nubs of the nub structure are advantageously molded in the inner panel. This leads to a weight-reduced and compact construction of the induction assembly.

The induction assembly can generally have only a single one such gap. This means that the core assembly has only two core bodies, which are spaced apart from one another by means of such a gap.

It is advantageous when the induction assembly has two or more such gaps. This means that the core assembly has two or more such core bodies, which are in each case spaced apart from one another by means of a gap. A corresponding protrusion as well as a corresponding elevation are thereby preferably provided for the respective gap.

Embodiments, in the case of which at least two of the elevations cross one another, are considered to be advantageous. The crossing elevations separate free sections of the inner panel, which are also referred to hereinafter as flat sections, from elevations of this type.

It is preferred when a corresponding core body of the core assembly is provided for the respective flat section.

In the case of advantageous embodiments, a U-shaped flow of the cooling fluid through the flow space takes place during operation. This leads to an efficient temperature control, in particular cooling, of the induction assembly. For this purpose, the heat exchanger preferably has two connecting pieces, through which the flow path leads. One of the connecting pieces thereby expediently serves as inlet, and the other one as outlet for the cooling fluid. The heat exchanger is thereby designed in such a way that a U-shaped flow of the cooling fluid in the flow space results during operation. This can be attained by means of a corresponding arrangement of the connecting pieces and/or of the flow-guiding components, for example partition walls and the like, in the flow space.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
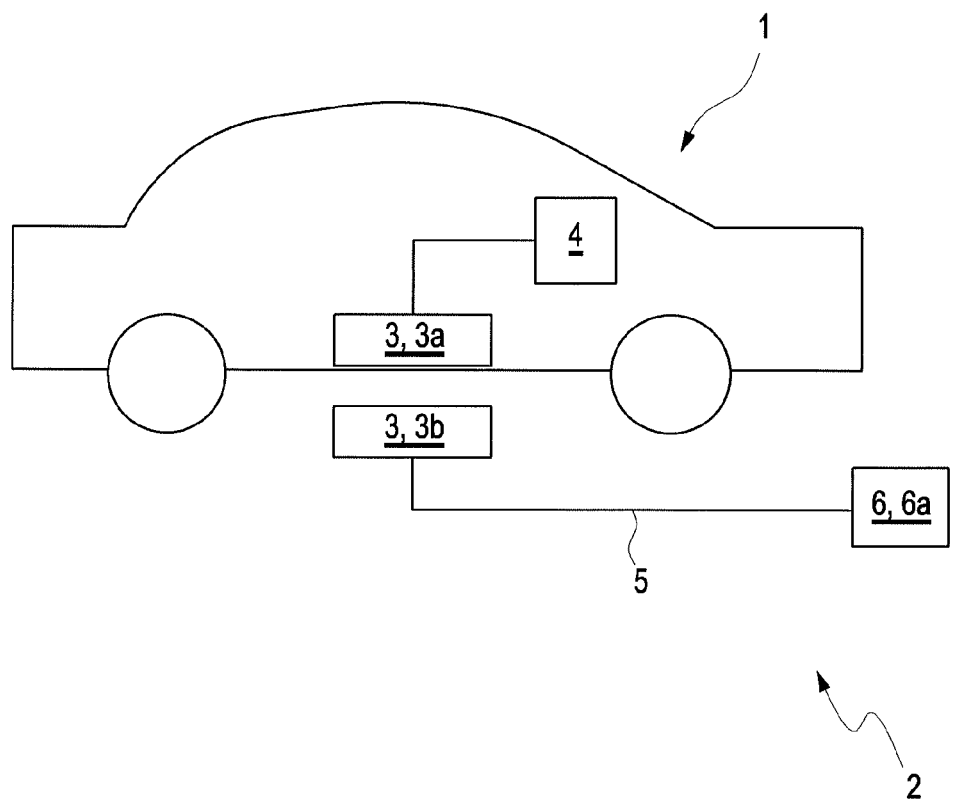
FIG. 1 shows a highly simplified, circuit diagram-like illustration of a motor vehicle and of a charging device for inductively charging a battery of the motor vehicle.

A charging device 2 shown in FIG. 1 is used for inductively charging a battery 4, as it is shown, for example, in FIG. 1. In the case of the shown exemplary embodiment, the battery 4 is part of a motor vehicle 1. The charging device 2 has two induction assemblies 3. One of the induction assembly 3 is arranged within or on the motor vehicle 1, respectively, and is therefore hereinafter also referred to as vehicle-internal induction assembly 3a. The other induction assembly 3 is arranged outside of the motor vehicle 1 and spaced apart from the motor vehicle 1 and is thus hereinafter also referred to as vehicle-external induction assembly 3b. The vehicle-internal induction assembly 3a is also known as vehicle assembly, and the vehicle-external induction assembly 3b as ground assembly. The vehicle-external induction assembly 3b is connected via a cable 5 to an external electrical energy source 6, thus in particular a power supply. In the shown example, the cable 5 connects the vehicle-external induction assembly 3b to a connecting unit 6a, the electrical energy source 6, which is also known as wall box. The vehicle-internal induction assembly 3a is electrically connected to the battery 4. During operation of the charging device 2, a voltage is inductively generated in the vehicle-internal induction assembly 3a with the help of the vehicle-external induction assembly 3b, and the battery 4 is charged via the electrical connection of the vehicle-internal induction assembly 3a.

Figure 2:
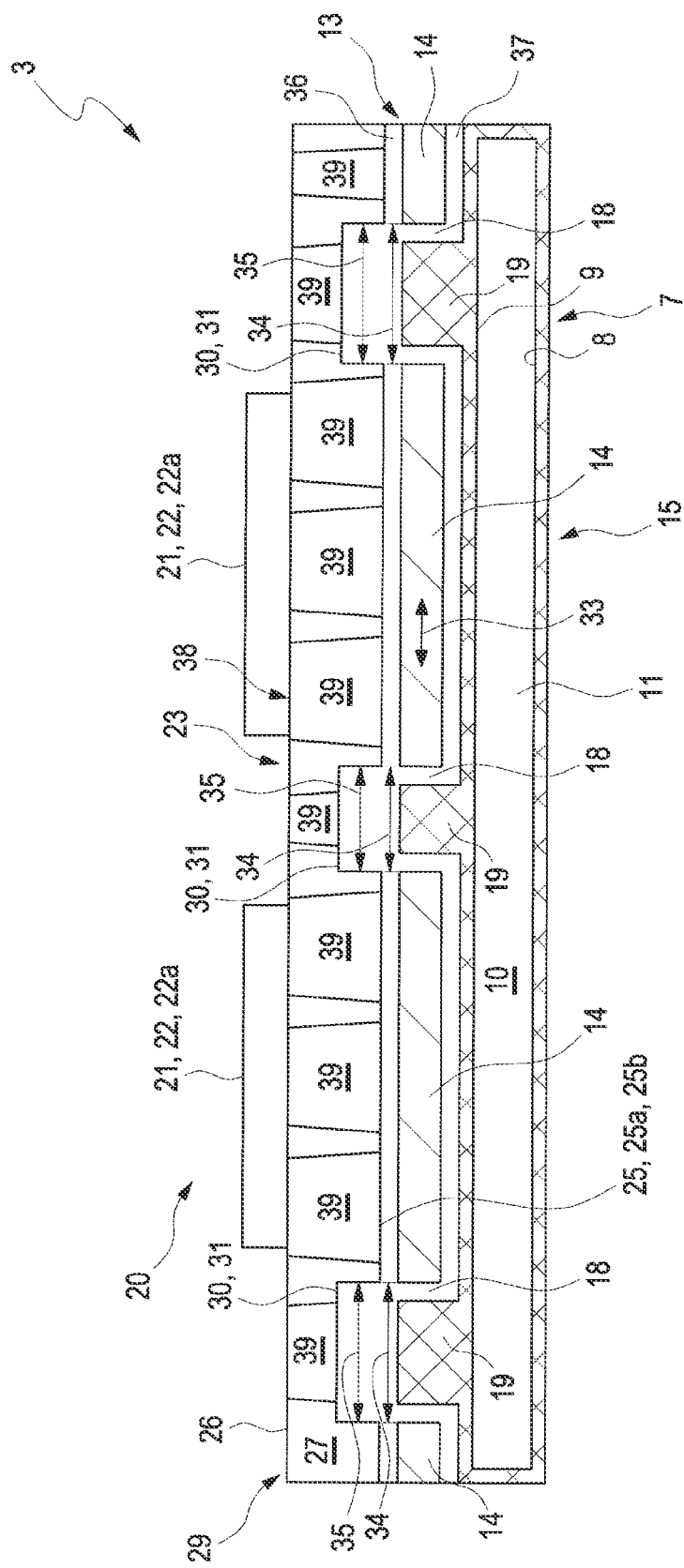
FIG. 2 shows a section through an induction assembly of the charging device.

FIG. 2 shows a section through the induction assembly 3. This is in particular the vehicle-internal induction assembly 3a.

The induction assembly 3 has a coil carrier 7 comprising an upper wall 8 and a lower wall 9 located opposite the upper wall 8. Upper wall 8 and lower wall 9 limit a space 10, which is hereinafter also referred to as receiving space 10. A coil winding 11, which is not shown in more detail, in particular a spiral winding, is received in the receiving space 10 of the coil carrier 7. On the side of the lower wall 9 facing away from the upper wall 8, the induction assembly 3 additionally has a core assembly 13, which has at least two core bodies 14. In the view shown in FIG. 2, four core bodies 14 are visible thereby. The coil carrier 7 is made of a material or substance, which differs from a metal or metal alloy, in particular of plastic. With the coil winding 11, the core assembly 13 forms a coil 15 of the induction assembly 3. In the case of the vehicle-internal induction assembly 3a, the coil 15 is therefore a secondary coil of the charging device 2. The core assembly 13, in particular the respective core body 14, is thereby expediently ferromagnetic. The respective core body 14 is in particular a ferrite body. The core bodies 14 are in each case spaced apart from one another by means of a corresponding gap 18. For at least one of the gaps 18, in the shown exemplary embodiment and preferably for the respective gap 18, the coil carrier 7 thereby has a corresponding protrusion 19, which penetrates into the corresponding gap 18. The respective protrusion 19 thus serves the purpose of positioning the corresponding core body 14. The respective protrusion 19 additionally leads to a mechanical stabilization of the coil carrier 7. The induction assembly 3 further has an electronics 20, which is electrically connected to the coil 15, in particular the coil winding 11. For this purpose, the electronics 20 has at least one electronic component 21, wherein two such electronic components 21 are provided in the exemplary embodiment shown in FIG. 2. The electronics 20 serves in particular the purpose of converting electrical voltage. The electronics 20 therefore preferably has at least one converter 22. In the case of the vehicle-internal induction assembly 3a, the converter 22 is preferably and expediently an AC/DC converter 22a, in order to convert the alternating current induced in the coil 15 into a direct current and to thus charge the battery 4.

The induction assembly 3 further has a heat exchanger 23 for controlling the temperature of, in particular cooling, the induction assembly 3. For this purpose, a cooling fluid flows through the heat exchanger 23. A flow path 24 (see FIG. 3) of the cooling fluid therefore leads through the heat exchanger 23. On the side of the core assembly 13 facing away from the lower wall 9, the heat exchanger 23 has an inner panel 25. The inner panel 25 is preferably an aluminum panel 25a or an aluminum alloy panel 25b. The heat exchanger 23 further has an outer wall 26, which is located opposite the inner panel 25 and which, with the inner panel 25, limits a flow space 27, through which the flow path 24 leads, through which the cooling fluid thus flows during operation. In the shown exemplary embodiment, the outer wall 26 is a panel, which is hereinafter also referred to as outer panel. In the shown exemplary embodiment, inner panel 25 and outer panel thereby form a two-layer cooling plate 29.

For at least one of the gaps 18 and thus for at least one of the protrusions 19, the inner panel 25 has an elevation 30, which is directed away from the protrusion 19 or from the lower wall 9, respectively and which is molded in the inner panel 25, i.e. formed by means of a formation 31. In other words, for at least one of the gaps 18, the inner panel 25 has a corresponding elevation 30, which is formed as a formation 31 of the inner panel 25 directed away from the lower wall 9. In the shown exemplary embodiment and preferably, the inner panel for the respective gap 18 has a corresponding one such elevation 30. An electromagnetic shielding of the coil 15 to the outside takes place by means of the inner panel 25. The electronics 20 is in particular electromagnetically shielded by means of the inner panel 25. The respective elevation 30 thereby results in that the electromagnetic shielding effect is increased in the region of the elevation 30. The electromagnetic shielding is thus only increased in the regions, in which an increased electromagnetic shielding is necessary due to the gap 18 between the adjacent core bodies 14. As can in particular be gathered from FIG. 2, the respective elevation 30 additionally leads to a decrease of the cross section, which can be flown through, in the flow space 27 and thus to an increase of the flow speed of the cooling fluid, which results in an improved heat transfer and thus an improved cooling in this region.

Figure 3:
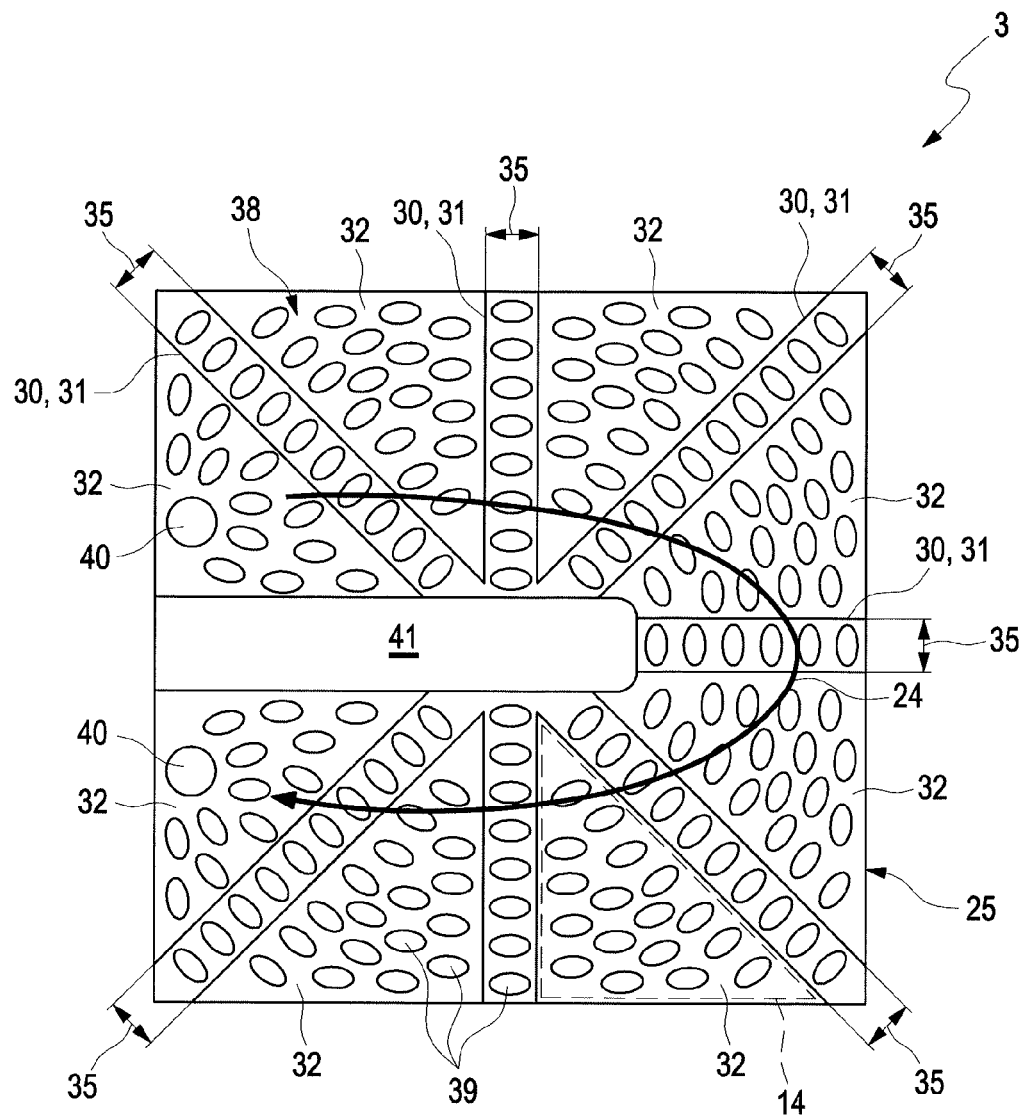
FIG. 3 shows a top view onto an inner panel of the induction assembly.

As can in particular be gathered from FIG. 3, the inner panel 25 has a total of four such elevations 30. The elevations 30 thereby run in a star-shaped manner and cross one another, wherein they separate eight flat sections 32 from one another, which are essentially triangular in the top view of FIG. 3, in the inner panel 25. The flat sections 32 are in each case free from such elevations 30. The core assembly 13 has a corresponding core body 14 for the respective flat section 32, wherein the respective core body 14, as suggested in a dashed manner in FIG. 3 for one of the flat sections 32, has the shape of a triangle corresponding to the shape of the corresponding flat section 32 in the top view. Purely in an exemplary manner, the core assembly 13 thus has eight core bodies in this exemplary embodiment, which are spaced apart from one another as whole by five gaps 18, which are not visible.

As can be gathered in particular from FIG. 3, the elevations 30 thereby run along the entire length of the corresponding gap 18. The elevations 30 as well as the gap 18 thereby run longitudinally. This means that in the distance direction 33 (see FIG. 2) of the corresponding core bodies 14, the respective gap 18 has a gap width 34, which is smaller than a non-illustrated gap length, which runs transversely to the gap width 34. The gap length is in particular at least twice as large as the gap width 34. An elevation width 35 running parallel to the gap width 34 of the respective elevation 30 thereby corresponds to the gap width 34 of the corresponding gap 18 and is arranged in such a way relative to the gap 18 that gap width 34 and elevation width 35 overlap.

As can be gathered in particular from FIG. 2, the core assembly 13 is spaced apart from the lower wall 9 in the shown exemplary embodiment and preferably. The internal panel 25 and the lower wall 9 thus limit a space 36, in which the core assembly 13 as well as the gap 18 are arranged.

A heat-conducting casting compound 37, which is not shown otherwise, is introduced into this space 36, which is also referred to hereinafter as casting space 36, so that the casting compound 37 fills the casting space 36. Casting compound 37 is thus filled between the core assembly 13 and the lower wall 9 as well as the inner panel 25 in the same way as within the respective gap 18 between the protrusions 19 and the core bodies 14.

As can further be gathered from FIGS. 2 and 3, a nub structure 38, which is molded in the inner panel 25 in the shown exemplary embodiment, is arranged in the shown exemplary embodiment in the flow space 24. The nub structure 38 has a plurality of locally formed nubs 39, which serve the purpose of generating turbulences in the flow of the cooling fluid and of the improved internal pressure resistance. In the shown exemplary embodiment, the nubs 39 are arranged in the flat sections 32 as well as on the elevations 30.

Preferably and as suggested in FIG. 3, the heat exchanger has two connecting pieces through which the flow path 24 leads. The connecting pieces 40 thereby serve the purpose of letting in as well as letting out the cooling fluid into the flow space 27 as well as out of the flow space 27. The heat exchanger 23 is thereby designed in such a way that, as suggested in FIG. 3, a U-shaped flow of the cooling fluid results during operation. In the shown exemplary embodiment, this is realized by means of a corresponding relative arrangement of the connecting pieces 40 to one another as well as a partition wall 41, which extends partially through the flow space 27 and which is arranged between the connecting pieces 40.

The invention claimed is:

1. An induction assembly of an inductive charging device for inductively charging a battery in a motor vehicle, the assembly comprising:
    a coil carrier including an upper wall, a lower wall located opposite the upper wall, and a receiving space disposed between and limited by the upper wall and the lower wall;
    a coil winding received in the receiving space;
    a core assembly arranged on a side of the lower wall facing away from the upper wall, the core assembly forms a coil with the coil winding, and the core assembly includes at least two core bodies that are spaced apart from one another by a gap; and
    a heat exchanger for controlling a temperature of the induction assembly, the heat exchanger including (i) an inner panel which, on a side of the core assembly facing away from the lower wall, is disposed spaced apart from the core assembly and (ii) an outer wall located opposite the inner panel, the inner panel and the outer wall limiting a flow space through which a flow path of a cooling fluid for controlling the temperature of the induction assembly leads;
    wherein the coil carrier further includes a corresponding protrusion for the gap, the protrusion protruding from the lower wall and penetrating into the gap; and
    the inner panel includes a corresponding elevation for the gap, the elevation formed as a formation of the inner panel that is directed away from the lower wall.

2. The induction assembly according to claim 1, wherein the outer wall of the heat exchanger is formed as an outer panel such that the inner panel and the outer panel form a two-layer cooling plate.

3. The induction assembly according to claim 1, wherein the induction assembly further includes electronics electrically connected to the coil winding, the electronics comprising at least one electronic component; and
   at least one of the at least one electronic components is arranged on a side of the outer wall facing away from the inner panel.

4. The induction assembly according to claim 1, wherein the gap extends longitudinally transversely to a distance direction of the core bodies; and
   the elevation extends longitudinally in parallel along the gap.

5. The induction assembly according to claim 1, wherein the gap has a gap width in a distance direction of the core bodies; and
   parallel to the gap width, the elevation has an elevation width that corresponds to the gap width and the elevation is arranged such that the gap width and the elevation width overlap.

6. The induction assembly according to claim 1, wherein the core assembly is spaced apart from the lower wall such that the lower wall and the inner panel limit a casting space in which the core assembly and the gap are arranged; and
   a heat-conducting casting compound fills the casting space.

7. The induction assembly according to claim 1, wherein the inner panel contains aluminum.

8. The induction assembly according to claim 1, wherein a nub structure comprising nubs is arranged on a side of the inner panel facing away from the core assembly; and
   the nubs are locally formed and are spaced apart from one another.

9. The induction assembly according to claim 1, wherein at least two elevations are provided that cross one another and separate free flat sections of the inner panel of such elevations from one another; and
   a corresponding core body is provided for the respective flat section.

10. The induction assembly according to claim 1, wherein the heat exchanger has two connecting pieces through which the flow path leads; and
    the heat exchanger is configured such that a U-shaped flow of the cooling fluid in the flow space results during operation.

11. The induction assembly according to claim 3, wherein the outer wall of the heat exchanger is formed as an outer panel such that the inner panel and the outer panel form a two-layer cooling plate.

12. An induction assembly of an inductive charging device for inductively charging a battery in a motor vehicle, the assembly comprising:
    a coil carrier including an upper wall, a lower wall disposed opposite the upper wall, and a receiving space limited by the upper wall and the lower wall;
    a coil winding disposed in the receiving space;
    a core assembly arranged on a side of the lower wall facing away from the upper wall, the core assembly forming a coil with the coil winding, the core assembly including at least two core bodies that are spaced apart from one another by a gap;
    a heat exchanger for controlling a temperature of the induction assembly, the heat exchanger including (i) an inner panel which, on a side of the core assembly facing away from the lower wall, is disposed spaced apart from the core assembly and (ii) an outer wall disposed opposite the inner panel, the inner panel and the outer wall limiting a flow space through which a flow path of a cooling fluid for controlling a temperature of the induction assembly extends;
    the coil carrier further including a corresponding protrusion for the gap, the protrusion protruding from the lower wall and penetrating into the gap;
    the inner panel including a corresponding elevation for the gap, the elevation formed as a formation of the inner panel that is directed away from the lower wall;
    wherein the outer wall of the heat exchanger is formed as an outer panel such that the inner panel and the outer panel form a two-layer cooling plate;
    wherein the gap extends longitudinally transversely to a distance direction of the at least two core bodies; and
    wherein the elevation extends longitudinally in parallel along the gap.

13. The induction assembly according to claim 12, wherein the induction assembly further includes electronics electrically connected to the coil winding, the electronics comprising at least one electronic component; and
    at least one of the at least one electronic components is arranged on a side of the outer wall facing away from the inner panel.

14. The induction assembly according to claim 12, wherein the gap has a gap width in the distance direction of the at least two core bodies; and
    parallel to the gap width, the elevation has an elevation width that corresponds to the gap width and the elevation is arranged such that the gap width and the elevation width overlap.

15. The induction assembly according to claim 12, wherein the core assembly is spaced apart from the lower wall such that the lower wall and the inner panel limit a casting space in which the core assembly and the gap are arranged; and
    a heat-conducting casting compound fills the casting space.

16. The induction assembly according to claim 12, wherein the inner panel contains aluminum.

17. The induction assembly according to claim 12, wherein a nub structure comprising nubs is arranged on a side of the inner panel facing away from the core assembly; and
    the nubs are locally formed and are spaced apart from one another.

18. The induction assembly according to claim 12, wherein at least two elevations are provided that cross one another and separate free flat sections of the inner panel of such elevations from one another; and
    a corresponding core body is provided for the respective flat section.

19. The induction assembly according to claim 12, wherein the heat exchanger has two connecting pieces through which the flow path leads; and
    the heat exchanger is configured such that a U-shaped flow of the cooling fluid in the flow space results during operation.

20. An induction assembly of an inductive charging device for inductively charging a battery in a motor vehicle, the assembly comprising:
    a coil carrier including an upper wall, a lower wall disposed opposite the upper wall, and a receiving space limited by the upper wall and the lower wall;
    a coil winding disposed in the receiving space;
    a core assembly arranged on a side of the lower wall facing away from the upper wall, the core assembly forming a coil with the coil winding, the core assembly including at least two core bodies that are spaced apart from one another by a gap;
a heat exchanger for controlling a temperature of the induction assembly, the heat exchanger including (i) an inner panel which, on a side of the core assembly facing away from the lower wall, is disposed spaced apart from the core assembly and (ii) an outer wall disposed opposite the inner panel, the inner panel and the outer wall limiting a flow space through which a flow path of a cooling fluid for controlling a temperature of the induction assembly extends;
the coil carrier further including a corresponding protrusion for the gap, the protrusion protruding from the lower wall and penetrating into the gap;
the inner panel including a corresponding elevation for the gap, the elevation formed as a formation of the inner panel that is directed away from the lower wall;
wherein the gap extends longitudinally transversely to a distance direction of the at least two core bodies;
wherein the elevation extends longitudinally in parallel along the gap;
wherein the gap has a gap width in the distance direction of the at least two core bodies;
wherein, parallel to the gap width, the elevation has an elevation width that corresponds to the gap width; and
wherein the elevation is arranged such that the gap width and the elevation width overlap.

* * * * *